United States Patent
Guering et al.

(10) Patent No.: US 9,505,483 B2
(45) Date of Patent: Nov. 29, 2016

(54) FRONT LANDING-GEAR WELL

(71) Applicant: Airbus Operations (SAS), Toulouse (FR)

(72) Inventors: Bernard Guering, Montrabe (FR); Yves Durand, Aussonne (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 128 days.

(21) Appl. No.: 14/348,093

(22) PCT Filed: Sep. 27, 2012

(86) PCT No.: PCT/FR2012/052194
§ 371 (c)(1),
(2) Date: Mar. 28, 2014

(87) PCT Pub. No.: WO2013/045852
PCT Pub. Date: Apr. 4, 2013

(65) Prior Publication Data
US 2014/0246542 A1  Sep. 4, 2014

(30) Foreign Application Priority Data

Sep. 30, 2011 (FR) ..................... 11 58802

(51) Int. Cl.
| *B64C 1/14* | (2006.01) |
| *B64C 1/06* | (2006.01) |
| *B64C 25/14* | (2006.01) |
| *B64C 1/10* | (2006.01) |
| *B64C 1/36* | (2006.01) |

(Continued)

(52) U.S. Cl.
CPC ................. *B64C 1/14* (2013.01); *B64C 1/061* (2013.01); *B64C 1/10* (2013.01); *B64C 1/36* (2013.01); *B64C 25/04* (2013.01); *B64C 25/10* (2013.01); *B64C 25/14* (2013.01)

(58) Field of Classification Search
CPC ......... B64C 1/14; B64C 25/04; B64C 25/10; B64C 1/10; B64C 1/36; B64C 25/14; B64C 1/061

See application file for complete search history.

(56) References Cited

U.S. PATENT DOCUMENTS 2,374,146 A * 4/1945 Waters ............. B64C 25/14
244/102 R
2,444,319 A * 6/1948 Winter ............. B64C 25/26
244/102 SL (Continued)

FOREIGN PATENT DOCUMENTS

FR  2910875  7/2008

OTHER PUBLICATIONS

International Search Report, Feb. 5, 2013.

*Primary Examiner* — Valentina Xavier
(74) *Attorney, Agent, or Firm* — Greer, Burns & Crain, Ltd.

(57) ABSTRACT

A forward part of an aircraft comprising a fuselage and a landing gear well housing a forward landing gear comprising a breaker strut designed to adopt an extended configuration when the landing gear is extended, configuration in which said breaker strut lies in a strut plane parallel to the transverse direction of the forward part. The forward part comprises a transverse beam resisting strut reactions located above the landing gear well and mounted on the fuselage at its two ends, the beam having a globally rectangular cross-section, in which the median plane parallel to the length of the rectangle is coincident with said strut plane.

15 Claims, 6 Drawing Sheets

(51) Int. Cl.
    *B64C 25/04*     (2006.01)
    *B64C 25/10*     (2006.01)

(56) References Cited

U.S. PATENT DOCUMENTS

| | | | | |
|---|---|---|---|---|
| 3,335,981 | A | * | 8/1967 | Pauli ........................ B64C 1/22 |
| | | | | 244/102 R |
| 7,784,736 | B2 | * | 8/2010 | Guering .................... B64C 1/10 |
| | | | | 244/102 R |
| 2007/0095976 | A1 | * | 5/2007 | Bietenhader ............ B64C 25/00 |
| | | | | 244/102 A |
| 2009/0078823 | A1 | | 3/2009 | Wood et al. |
| 2013/0112808 | A1 | * | 5/2013 | Guering .................. B64C 25/20 |
| | | | | 244/102 SS |
| 2014/0203143 | A1 | | 7/2014 | Durand et al. |

\* cited by examiner

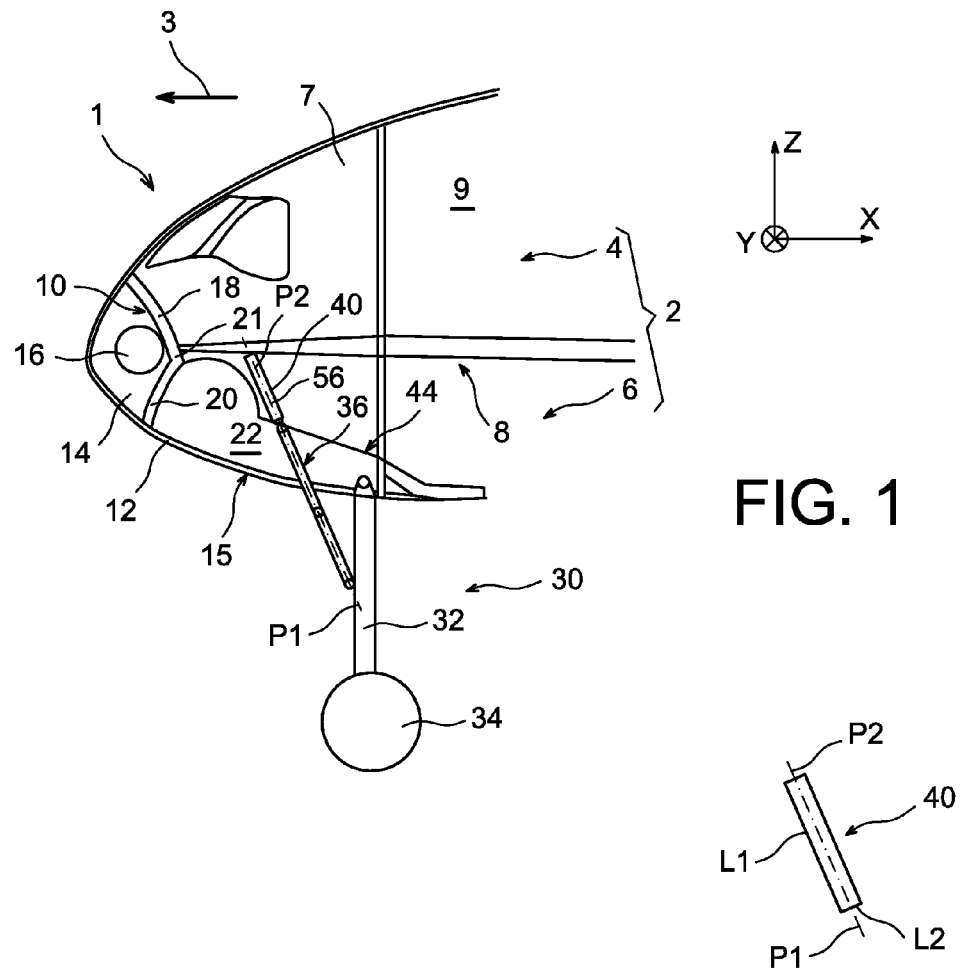
FIG. 1
FIG. 1a
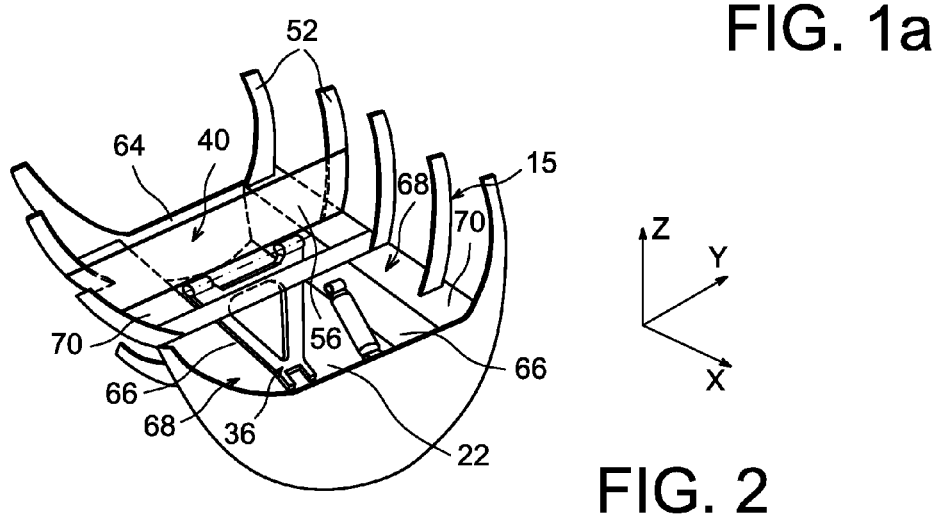
FIG. 2

FRONT LANDING-GEAR WELL

CROSS-REFERENCES TO RELATED APPLICATIONS

This application claims the benefit of the French patent application No. 11 58802 filed on Sep. 30, 2011, the entire disclosures of which are incorporated herein by way of reference.

BACKGROUND OF THE INVENTION

This invention relates to a forward part of an aircraft, also called the nose cone, comprising a landing gear well housing a forward landing gear.

The invention is applicable to all types of aircraft.

Many developments have been made to aircraft nose cones to optimize its mass, volume, cost, safety, ease of fabrication, maintenance, etc. One example of such a nose cone is disclosed in documents FR 2 910 875 and U.S. Pat. No. 7,784,736.

Despite the existence of many constructions, the environment of the nose cone landing gear well can still be optimized, particularly to distribute forces introduced by the front landing gear breaker strut.

Normally, the landing gear well is made by means of stiffened panels forming a housing isolated from the pressure, the well being surrounded by a network of frames that stiffen the fuselage frames. With this type of design, the panels forming the landing gear well have to be large to be able to resist forces from the forward landing gear, and particularly reactions from the breaker strut.

This creates disadvantages in terms of mass and volume, and makes it necessary to use a metallic material to manufacture panels of the landing gear well. Furthermore, the solution described above usually induces high mechanical loads in the forward zone of the windshield, which are obviously undesirable.

Furthermore, the nose cone can also be optimised so as to facilitate access by operators working on fabrication/handling of this very densely occupied part.

In particular, the high pressure zone located above the landing gear well that will contain a large amount of instruments/equipment, is often difficult to access for operators.

SUMMARY OF THE INVENTION

Therefore, the purpose of the invention is to at least partially overcome the disadvantages mentioned above dealing with embodiments according to prior art.

To achieve this, the primary purpose of the invention is the forward part of an aircraft consisting of a fuselage and a landing gear well comprising a forward landing gear with a breaker strut designed to adopt an extended configuration when the landing gear is extended, a configuration in which said breaker strut lies in a strut plane parallel to the transverse direction of the forward part. According to the invention, the forward part comprises a transverse beam resisting strut reactions located above the landing gear well and mounted on the fuselage at its two ends, said beam having a globally rectangular cross-section, in which the median plane parallel to the length of the rectangle is coincident with said strut plane.

The invention thus provides a simple solution for the transfer of reactions from the strut, by means of a beam shaped structural element oriented in the same plane as the extended breaker strut, and which participates in creating a more direct path of forces to the fuselage. This particular geometric layout assures a good resistance to strut reactions because these reactions can be routed to the ends of the beam by shear resistance, and are then distributed into the fuselage.

The invention can also make use of elements with simple geometries, suitable for manufacturing from a composite material preferably including a mix of resin and carbon fibers. The use of this material, particularly for the beam and the elements defining the landing gear well, results in a non-negligible mass saving.

The mass is also reduced by reducing the dimension of elements defining the landing gear well, which no longer need to fulfill the function of resisting reactions transferred from the breaker strut, in this case this function being performed by the special purpose beam. This mass reduction is naturally accompanied by a reduction in the volume of the landing gear well. This advantageously leads to an increase in surrounding pressurized volumes, allowing the integration of nose cone functions.

Finally, the invention very much limits the distribution of strut forces towards the forward windshield zone, which reduces risks of breakage of the windshield.

Preferably, the ratio between the length of the rectangular section of the beam and the length of this beam is between 3 and 6, and more preferably between 4 and 5, and/or the ratio between the length and the width of the rectangular section is between 8 and 12, and more preferably between 9 and 11. This structural element is thus in the form of a relatively short "plane beam", with a high inertia in the plane of the forces in which it lies. The result is very small deformation of this beam, strut forces can be transferred directly to the ends of the beam through shear resistance.

Preferably, said strut force resistance beam extends from a top partition of the landing gear well down to a floor of said aircraft forward part. This can give or result in a tall beam that fits perfectly well into its environment without any need for a substantial modification to the architecture of the nose cone. The relatively large height of the beam due to its very short length, not only increases its stiffness but also reduces stress concentrations in the fuselage, since forces introduced into it are distributed over a larger interface. Therefore the distribution of forces is advantageously more uniform.

Preferably, said two ends of the beam are mounted on a skin of said fuselage, giving very good diffusion/dilution of forces in this fuselage. Preferably, this applies to the inner skin of the fuselage, even if the assembly could alternatively or simultaneously be made on fuselage frames.

Preferably, said beam has a lower longitudinal edge provided with means of assembly of said breaker strut. This can give or result in direct transfer of strut forces into the transverse beam. Alternately, the lower longitudinal edge of the beam could be installed on an intermediate structure that would itself support said means of mounting said breaker strut. This intermediate structure could for example be of the metallic insert type added onto the beam, which is preferably made of a composite material.

Furthermore as mentioned above, said beam is made of a composite material, preferably a mix of resin and carbon fibers, to save mass. Nevertheless it could be metallic without going outside the scope of the invention. Note that the partitions defining the landing gear well could also be made of a composite material.

According to another aspect of this invention, its purpose is a forward landing gear well for an aircraft comprising an upper partition comprising at least one removable cover closing off a manhole.

In this case the invention is remarkable in that it discloses use of the roof of the landing gear well to allow room for operators to pass through to perform fabrication/handling operations in the environment inside the landing gear well. In particular, it is preferably arranged so that the operator can stand upright in the landing gear well with his body passing through the manhole.

Thus, the invention eliminates some existing trapdoors, usually formed in the bottom part of the fuselage.

There are several possible configurations, namely a single manhole closed off by one or several removable covers, or several manholes closed off by the same removable cover, or each manhole closed off by one or several removable covers.

Secondly, the removable cover(s) may form all or some of the upper partition. This can thus be composed solely of covers or a single removable cover, or formed from one or several fixed upper panels with one or more openings forming manholes closed off by the removable covers.

Conventionally, the area of a manhole is larger than 0.225 $m^2$, normally in the form of a 450 mm wide and 500 mm long rectangle. In the invention each manhole is preferably square or rectangular with an area of the order of 1 $m^2$.

Preferably, the landing gear well comprises two opposite lateral partitions, each partition forming an integral part of a lateral box formed jointly with an upper panel connected firstly to the upper longitudinal edge of the lateral partition and secondly on the fuselage. Such lateral boxes can advantageously stiffen the perforated fuselage due to the presence of the forward landing gear well, and thus stiffen the lateral partitions of this forward landing gear well, in order to minimize their deformation.

To save mass, each removable cover is preferably in the form of a honeycomb sandwich structure. This structure may be identical to or similar to the composite structure conventionally adopted for articulated fuselage covers, closing off the lower part of the landing gear well.

Another purpose of the invention is a forward part of an aircraft comprising such a landing gear well housing a forward landing gear. Preferably, the forward part comprises one or several transverse stiffeners connected to the fuselage at their ends and routed close to the upper partition. These stiffeners also participate in stiffening the fuselage perforated at the forward landing gear well, and consequently limit forces to be resisted by the above-mentioned lateral boxes.

Preferably, the forward part comprises a forward landing gear comprising a deployment jack and a breaker strut both mounted on the lateral partitions of the landing gear well. This can very significantly reduce the weight of the removable covers of the roof of the landing gear well, considering that they no longer need to resist breaker strut forces and jack forces. Preferably, they are designed to resist pressure only, and can thus be small thickness, for example of the order of 100 mm thick when they are made of a carbon/Nomex™ sandwich. In other words, it is preferably arranged such that the removable covers do not have any direct mechanical link with the forward landing gear.

This solution with removable covers for the roof of the landing gear well may also be combined with the solution described above, integrating said transverse beam resisting reactions from the breaker strut.

Thus, said forward landing gear preferably comprises a breaker strut designed to adopt an extended configuration when the landing gear is extended, in which said breaker strut lies in a strut plane parallel to the transverse direction of the forward part, and the forward part also comprises a transverse beam to resist strut forces arranged above the landing gear well and mounted at its two ends on the fuselage, said beam having a globally rectangular section of which the median plane parallel to the length of the rectangle is coincident with said strut plane.

Finally, another purpose of the invention is an aircraft with a forward part of the type defined above.

Other advantages and characteristics of the invention will become clear after reading the detailed non-limitative description given below.

BRIEF DESCRIPTION OF THE DRAWINGS

This description will be made with reference to the appended drawings among which;

FIG. 1 shows a diagrammatic side view of a forward of an aircraft according to one preferred embodiment of this invention;

FIG. 1a shows a sectional view of the beam that resists reactions from the strut located in the forward part of the aircraft shown in FIG. 1;

FIG. 2 shows a diagrammatic perspective view of the environment of the landing gear well installed in the forward part of the aircraft;

DETAILED DESCRIPTION OF THE PREFERRED EMBODIMENTS

Figure 3:
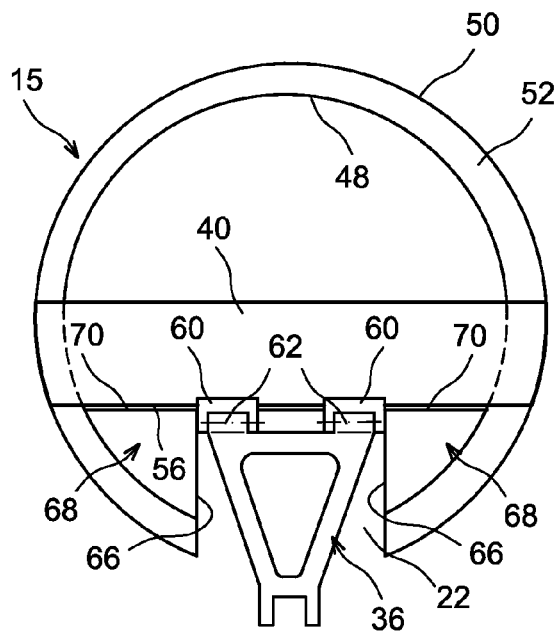
FIG. 3 shows a diagrammatic cross-sectional view of the forward part of the aircraft.

Throughout the following description, by convention X is the longitudinal direction of the aircraft, Y is the direction transverse to the aircraft and Z is the vertical direction or the height, these three directions X, Y and Z being mutually orthogonal.

Furthermore, the terms "forward" and "aft" should be considered relative to the direction of motion of the aircraft that occurs as a result of the thrust applied by the turbojets, this direction being shown diagrammatically by the arrow 3.

The forward part 1 comprises firstly a pressurized zone 2 in its aft most part within which there is a separation floor 8 between an upper pressurized compartment 4 usually dedicated to the transport of persons, and an underfloor pressurized compartment 6 usually dedicated to storage of technical equipment specific to the aircraft and/or to storage of the cargo. More precisely, the upper pressurized compartment 4 usually comprises, in the direction from the forward end towards the aft end, the aircraft cockpit 7 followed by the passenger cabin 9. Furthermore, the pressurized underfloor compartment 6 usually comprises, from the forward end towards the aft end, a so-called technical hold for storage of technical equipment specific to the aircraft followed by a so-called cargo hold that will be used to store cargo.

The pressurized zone 2 is delimited at the forward end by a bulkhead 10 that functions jointly with the nose cone 12 of the fuselage 15, to define a non-pressurized radome zone 14 in which the radar assembly 16 is located. The section of the bulkhead 10 is globally V-shaped open forwards, the ends of the V are fixed to the fuselage 15 and the apex facing in the aft direction is fixed to the forward end of the floor 8. The upper part 18 of the bulkhead 10 delimits the forward part of the cockpit, while the lower part forms firstly a forward partition 20 of the unpressurised landing gear well 22 and secondly a panel 21 delimiting the underfloor pressurized compartment 6, that passes partly above the landing gear well 22.

The forward landing gear well is designed to house a forward landing gear 30 in its retracted state, different from the extended state shown diagrammatically in FIG. 1. The forward landing gear 30 is of the conventional type known to those skilled in the art. It generally includes a landing strut 32 installed articulated at one of its ends on the landing gear well and comprises a set of wheels 34 at its other end. It also comprises one or several extension jacks (not shown) and a breaker strut 36 usually made from two segments hinged to each other, the lower end of which is articulated onto the strut 32. In the extended state of the landing gear shown in FIG. 1, the breaker strut 36 is designed to adopt an extended configuration in which the two segments are aligned, to lie in a strut plane P1 parallel to the Y direction. This plane P1 is inclined from the vertical, for example at an angle of between 20 and 50°.

According to one particular feature of the invention, the upper end of the breaker strut 36 is articulated on a transverse beam 40 resisting strut reactions. The beam 40 oriented along the Y direction has a globally rectangular cross-section shown in FIG. 1a, of which the median plane P1 parallel to the length L1 and perpendicular to the width L2 of the rectangle is coincident with said strut plane P1.

The beam 40 is thin, so that it can be considered as "plane beam". This thickness corresponding to the width L2 of the above-mentioned rectangle may for example be of the order of 50 to 60 mm. This thickness is similar to the thickness of load-resisting structures in the landing gear well, particularly its sealed rear bulkhead that resists reactions from the forward landing gear. In this respect, note that the ratio between the length L1 and the width L2 of the rectangular section is preferably between 9 and 11, which symbolizes the "plane" shape of this beam. This gives it an excellent capacity to integrate forces from the center towards the ends, with minimum deformation. Furthermore, the beam 40 is short, in other words it has a large height to length ratio, which means that the ratio between the length L1 of the rectangular section of the beam and the length L of this beam referenced in FIG. 2 is preferably between 4 and 5. Typically, the length L1 of the section, in other words the height of the beam, is of the order of 600 mm, while the length L of the beam along the Y direction is between 240 and 300 cm. The relative length of the beam could be even smaller, but in this case, it is arranged such that the beam extends along the vertical direction Z, occupying practically the entire space between the upper partition 44 of the landing gear well and the floor 8.

With reference to the three FIGS. 1 to 3, the figures show that the beam 40, designed solely to resist forces introduced by the breaker strut 36, is arranged above the landing gear well 22 and is installed fixed at its two ends on the fuselage 15. These ends are preferably added onto the inner skin 48 separated from the outer skin 50 of the fuselage by transverse frames 52. The beam could alternately be fixed to the frames 52, forces finally being distributed through the fuselage skins. To achieve this, the connection method at the fuselage is preferably made of simple double angles (not shown) placed on the fuselage at the ends of the beam. The connection between the beam 40 and the angles consists of simple shear screws over the entire height of the edges of the beam. Excess material thicknesses may be provided at junctions between parts, to make them stiffer.

The beam 40 is thus dedicated exclusively to resisting reaction forces from the strut, while remaining connected to the fuselage at its ends only. Furthermore, the beam is provided with means of assembling the strut 36 at the median part of its lower longitudinal edge 56, in this case in the form of devises 60 fixed to the edge 56, and holding tenons 60 fixed to the upper end of the breaker strut 36. Therefore, strut reactions do no pass into the upper partition of the landing gear well, but are inserted directly into the "plane beam" and then pass by shear towards the ends of the beam, before being distributed into the fuselage 15.

The beam 40 can be made in different ways and from different materials. Firstly, it can be in the general form of a "plane box", for example a genuine double skin box, in other words a parallelepiped shaped box made from six stressed external panels. Transverse ribs could also be integrated inside the box. This solution is preferred because it is mechanically very efficient, but another solution with a single skin could also be envisaged without going outside the scope of the invention.

For the choice of materials, metallic elements can be selected, or elements made of composite materials, preferably of the type comprising a mix of resin and carbon fibers. The composite may be of the monolithic type made by assembling parts by riveting, gluing of co-baking. The double skin solution itself may be made using a sandwich structure comprising a central honeycomb core enclosed between two composite skins.

Now with reference to FIGS. 2 to 4b, remember that the forward landing gear well 22 creates a large opening in the lower part of the fuselage. Thus the skins and frames are perforated to allow the forward landing gear to extend from and retract into the forward landing gear well. The well 22 is then open downwards, this opening being closed off by articulated covers that, when in the closed position, reform the aerodynamic surface of the missing part of the fuselage.

The well 22 is delimited by the forward partition 20, an aft partition 64, the upper partition 44 and two lateral partitions 66 opposite and facing each other.

Each of the lateral partitions 66 preferably extends approximately parallel to the X and Z directions over the entire length of the landing gear well 22. Each of them forms an integral part of a lateral box 68 running longitudinally along the sides of the well 22, being formed jointly with an upper panel 70 connected firstly to the upper longitudinal edge of the lateral partition 66 and secondly onto the fuselage 15, preferably on the skins. Thus, each box 68 preferably has a globally quarter-circle shaped cross-section, with a radius corresponding to the radius of the outer skin of the fuselage 50, as can be seen better in FIG. 3. This stiffens the fuselage that is perforated due to the presence of the forward landing gear well, and thus stiffens the lateral partitions in this forward landing gear well in order to better limit their deformation.

The forward part 1 is also provided with several transverse stiffeners connected to the fuselage at their ends and passing close to the upper partition 44, in order to limit forces to be resisted by the boxes 68.

Figure 4A:
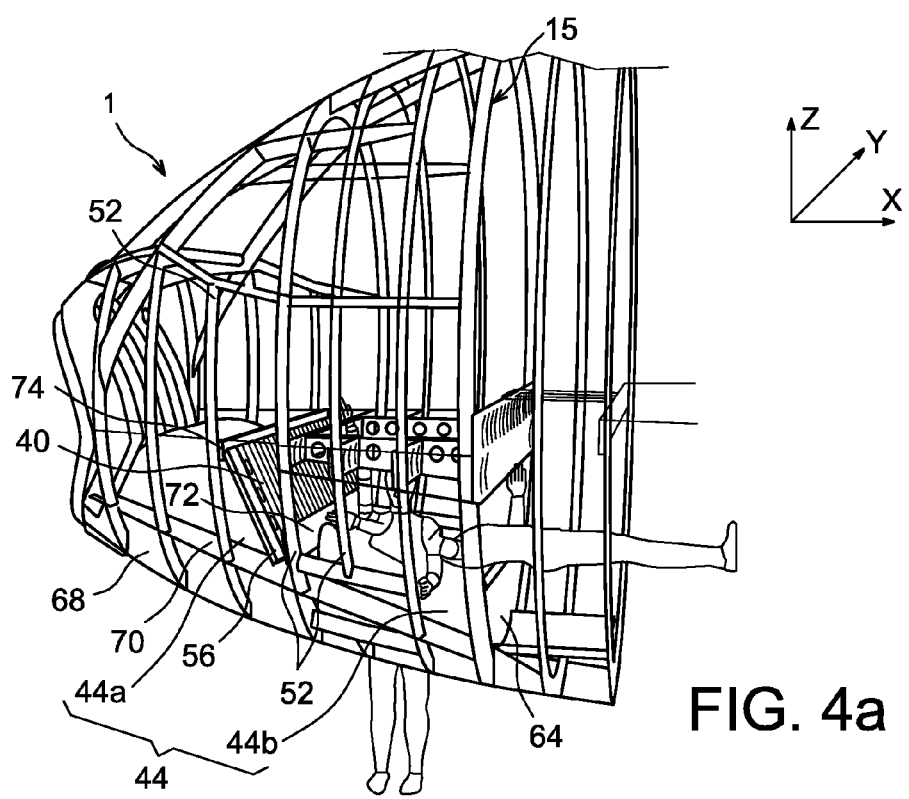
FIGS. 4a and 4b show the forward part of the aircraft in more detail, with the removable landing gear well roof covers installed.
Figure 4B:
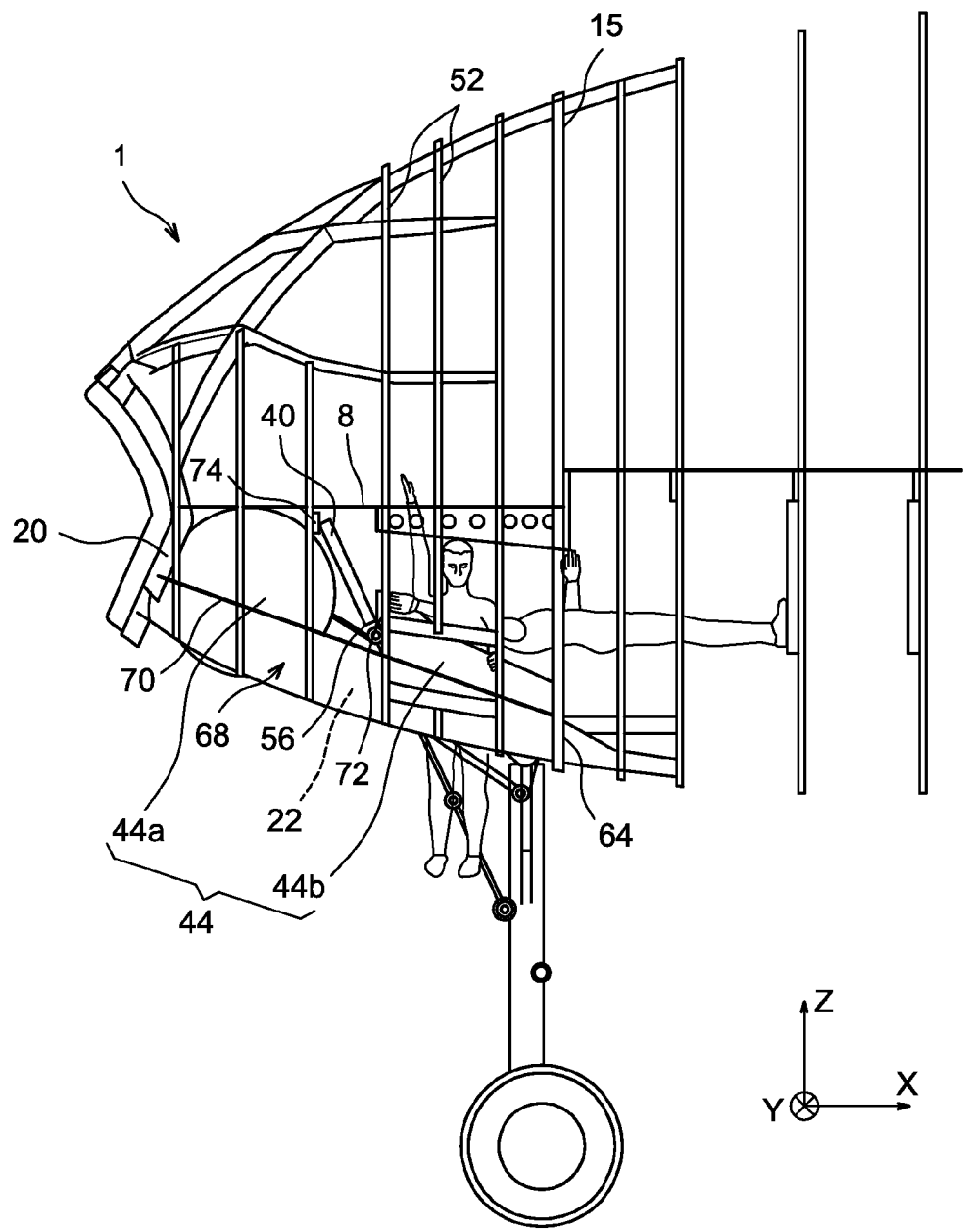
Figure 5A:
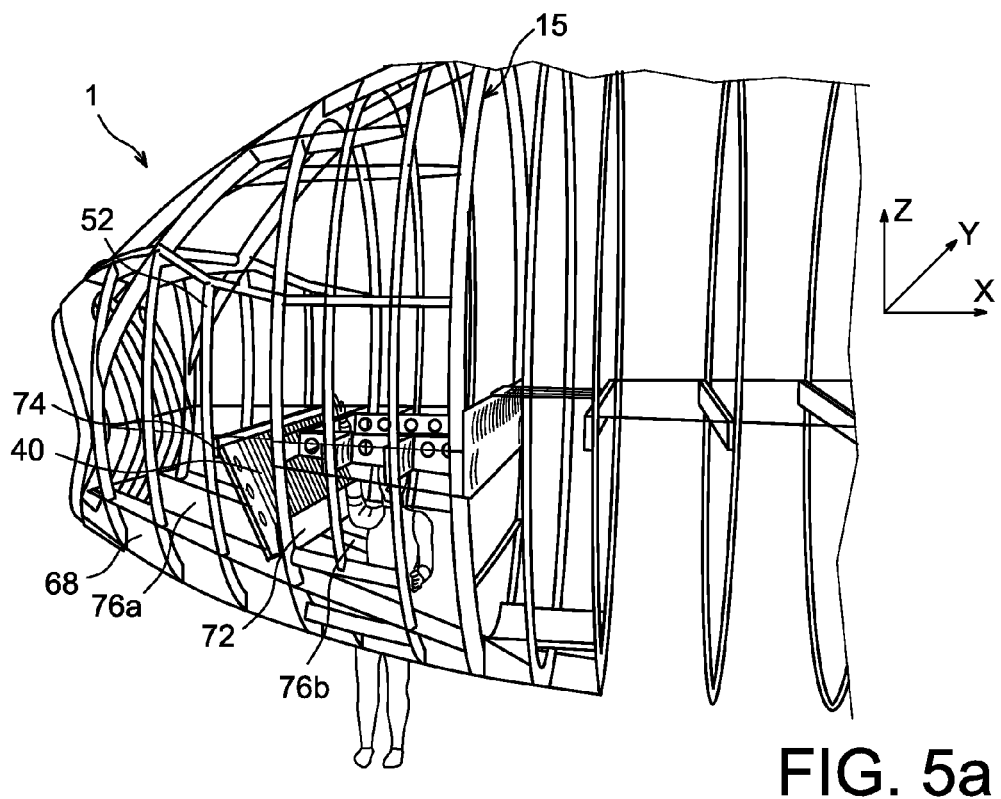
FIGS. 5a and 5b show the forward part of the aircraft in more detail, with the removable landing gear well roof covers removed.
Figure 5B:
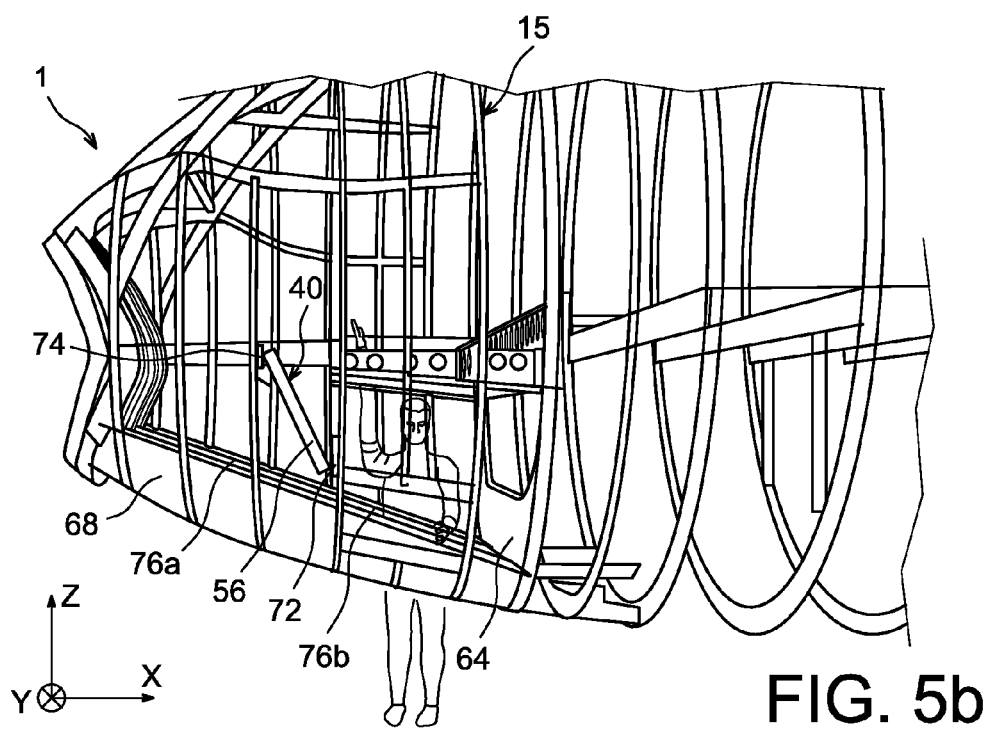
Figure 6:
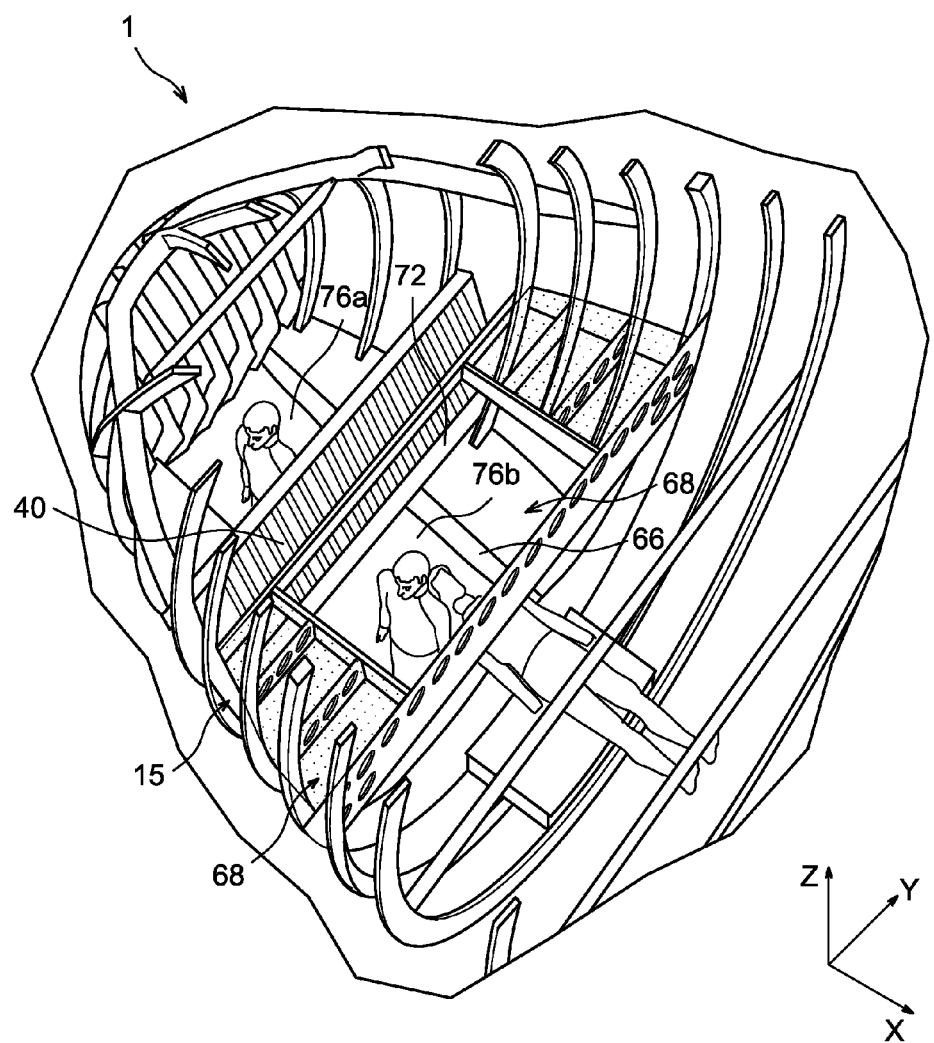
FIG. 6 is a view similar to that in FIG. 5a, with a different perspective angle.
Figure 7:
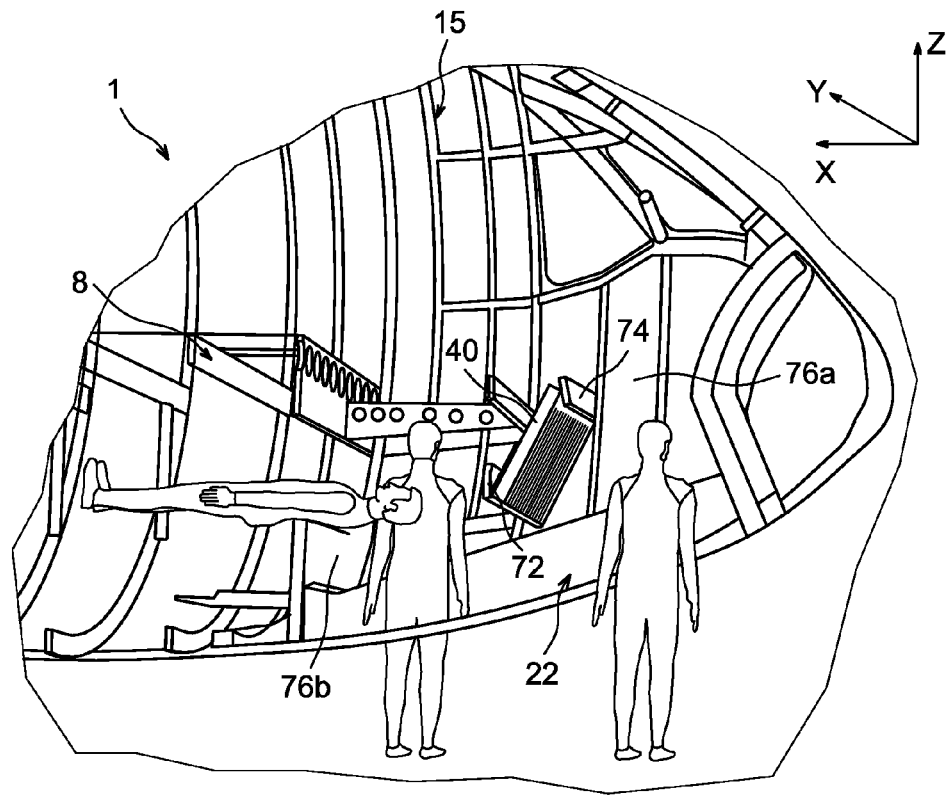
FIG. 7 is a perspective view similar to the views in FIGS. 6 and 5a, with the forward part of the aircraft cut longitudinally along a vertical median plane.

In the illustrated preferred embodiment, the ends of a first transverse spar 72 shown in FIGS. 4a and 4b connect two far portions of an interrupted fuselage frame 52, passing close to the lower edge 56 of the beam 40, above the upper partition 44. The ends of a second transverse spar 74, also shown in FIGS. 4a and 4b, also connects two far portions of an interrupted fuselage frame 52, passing close to a landing wheel housing and the upper edge of the beam 40, in other words close to the floor 8. This same edge may bear on the second spar 74 as shown in the figures.

Another special feature of this invention lies in the fact that the upper partition 44 comprises removable covers that release/close off manholes. In the preferred embodiment shown, a forward removable cover 44a and an aft removable cover 44b are provided, each installed removably around the periphery of the well. In this case, these two covers 44a, 44b shown in FIGS. 4a and 4b make up the entire part of the upper partition 44. They may both be convex upwards, so as to house the forward landing gear in its retracted state. They are installed reversibly at their periphery, which means that they are also mounted one above the other at their junction, for example close to the first transverse stiffener spar 72.

For example, the reversible means of mounting the covers 44a, 44b may be simple shear screws passing firstly through the edge of the covers that are then preferably provided with peripheral metallic stiffeners, and secondly passing through the elements of the landing gear well that support these covers, in this case the lateral boxes 68.

The removable covers 44a, 44b are preferably in the form of a honeycomb sandwich structure similar to that conventionally used for articulated fuselage covers closing off the lower part of the landing gear well.

In FIGS. 5a, 5b, 6 and 7, the forward part of the aircraft 1 is shown with its removable covers removed. Each cover thus releases a manhole with a global rectangular area of the order of 1 m², through which an operator can stand upright to perform fabrication/handling operations. It is a forward manhole 76a, separated from a second manhole 76b by the spar 72.

Operators are shown in the lying down and upright positions in FIGS. 5a to 7, in order to show the different access possibilities that can be made with these manholes 76a, 76b. In particular, the operator can stand upright through each of the passages, with his head just below the floor 8.

Figure 8:
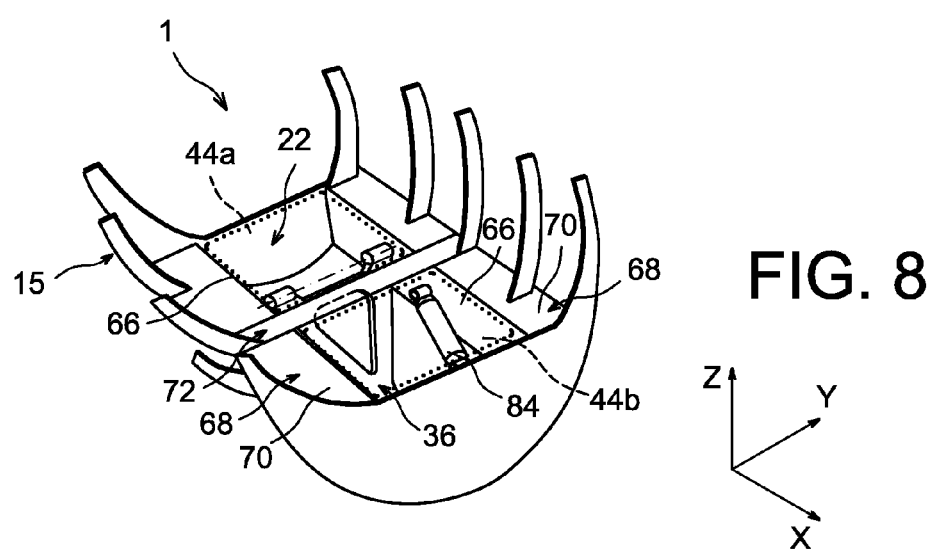
FIG. 8 shows a view similar to that in FIG. 2, with the forward part of the aircraft being presented according to another preferred embodiment of this invention.

According to another preferred embodiment shown in FIG. 8, the breaker strut 36 is mounted articulated on the lateral partitions 66 of the well 22, in the same way as the extension jack 84. Strut reactions are thus resisted satisfactory by the lateral boxes 68.

In this preferred embodiment, as in the previous embodiment, the removable covers 76a, 76b are designed to resist only pressure, and do not resist any load originating directly from the forward landing gear 30. Consequently they can be thin, for example about 100 mm thick.

Obviously, those skilled in the art could make various modifications to the invention that has just been described as non-limitative examples only.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A forward part of an aircraft comprising:
   a fuselage extending lengthwise along a longitudinal direction of the aircraft,
   a landing gear well and
   a forward landing gear housed in the landing gear well and comprising a breaker strut designed to adopt an extended configuration when the landing gear is extended, and in the extended configuration, said breaker strut lies in a strut plane and extends along a direction parallel to a transverse direction of the forward part, the transverse direction being orthogonal to the longitudinal direction of the aircraft,
   the forward part of an aircraft further comprising a transverse beam resisting breaker strut reactions located above the landing gear well and the transverse beam having opposing ends mounted orthogonal to the longitudinal direction of the aircraft on horizontally opposing sides of the fuselage, said transverse beam having a globally rectangular cross-section, in which a median plane parallel to a length of the globally rectangular cross-section is coincident with said strut plane.

2. The forward part of an aircraft according to claim 1, wherein a ratio between a length of the beam extending in the transverse direction to the length of the globally rectangular cross-section of the beam is between 3 to 1 and 6 to 1.

3. The forward part of an aircraft according to claim 1, wherein a ratio between a length of the beam extending in the transverse direction to the length of the globally rectangular cross-section of the beam is between 4 to 1 and 5 to 1.

4. The forward part of an aircraft according to claim 1, wherein a ratio between the length and a width of the globally rectangular cross-section is between 8 to 1 and 12 to 1.

5. The forward part of an aircraft according to claim 1, wherein a ratio between the length and a width of the globally rectangular cross-section is between 9 to 1 and 11 to 1.

6. The forward part of an aircraft according to claim 1, wherein said beam extends from a top partition of the landing gear well to a floor of said forward part of the aircraft.

7. The forward part of an aircraft according to claim 1, wherein said opposing ends of the beam are mounted on a skin of said fuselage.

8. The forward part of an aircraft according to claim 1, wherein said beam has a lower longitudinal edge provided with means of assembly of said breaker strut.

9. The forward part of an aircraft according to claim 1, wherein said beam is made of a composite material.

10. A forward part of an aircraft comprising:
    a forward partition separating a forward landing gear well from a radome zone which houses a radar equipment;
    a forward landing gear well located aft of said forward partition and housing a forward landing gear; and
    an upper partition, below which the forward landing gear well is located, having at least one removable cover closing off a manhole for accessing the forward landing gear well.

11. The forward part of the aircraft according to claim 10, further comprising two opposite lateral partitions, each partition forming an integral part of a lateral box formed jointly with an upper panel connected firstly to an upper longitudinal edge of each lateral partition, and secondly to a fuselage of the aircraft.

12. The forward part of the aircraft according to claim 10, wherein the removable cover is in the form of a honeycomb sandwich structure.

13. The forward part of the aircraft according to claim 10, further comprising one or more transverse stiffeners having opposing ends connected to a fuselage of the aircraft and routed adjacent to the upper partition.

14. The forward part of the aircraft according to claim 10, wherein the forward landing gear comprises a deployment jack and a breaker strut both mounted on lateral partitions of the landing gear well.

15. The forward part of the aircraft according to claim 10, wherein said forward landing gear comprises a breaker strut designed to adopt an extended configuration when the forward landing gear is extended, wherein said breaker strut lies in a strut plane parallel to a transverse direction of the aircraft, and in that the breaker strut comprises a transverse beam to resist strut forces arranged above the landing gear well and the transverse beam mounted at opposing ends to a fuselage of the aircraft, said transverse beam having a globally rectangular cross-section, in which a median plane parallel to a length of the globally rectangular cross-section is coincident with said strut plane.

\* \* \* \* \*